Jan. 27, 1942. G. D. AHRGAL 2,271,283
LAWN MOWER
Filed March 2, 1940 2 Sheets-Sheet 1

INVENTOR.
GUSTAV D. AHRGAL
BY
Lawrence H. Cohn
ATTORNEY.

Jan. 27, 1942.  G. D. AHRGAL  2,271,283
LAWN MOWER
Filed March 2, 1940  2 Sheets-Sheet 2

INVENTOR.
GUSTAV D. AHRGAL
BY Lawrence H. Cohn
ATTORNEY.

Patented Jan. 27, 1942

2,271,283

UNITED STATES PATENT OFFICE 2,271,283

LAWN MOWER

Gustav D. Ahrgal, Jennings Station, Mo.

Application March 2, 1940, Serial No. 321,815

7 Claims. (Cl. 56—26)

My invention relates to improvements in lawn mowers and the principal object of my invention is to provide a spring motor which is especially applicable for use in connection with a manually powered mower to reduce the labor required to cut the growth on an inclined terrace.

An important object of my invention is attained in the provision of a spring motor embodying rotatable elements for transmitting power to and receiving power from a torsion spring, and means which enable the said elements to be turned in either direction of rotation to effect a winding of the spring, and likewise to be driven by said spring in either direction of rotation. Where employed on a hand powered mower and connected for operation when mowing a sloping terrain, the spring motor stores energy derived from gravitational force acting on the machine on a down hill stroke and facilitates checking or retarding of the machine on this stroke. On a following uphill stroke the spring motor releases its stored energy to aid the operator in driving the mower. Accordingly, by the means described herein the mowing of an inclined terrace requires little or no greater labor than that required for level surface mowing.

The aforementioned provision for reversing the action of the spring renders the device especially applicable and advantageous for use in connection with a lawn mower since it enables the spring to be wound either on the forward, cutting stroke of the machine and unwound on the backward, idling stroke, or, conversely, wound on the backward stroke and unwound on the forward stroke of the machine. Consequently the operator may locate himself at the top or the bottom of the slope and in either instance cause the spring to exert its force to aid in driving the mower on the uphill stroke, whether such be the cutting or idling stroke of the mower.

Other objects and advantages will appear from the following description and accompanying drawings illustrating a presently preferred embodiment of my invention.

Figure 3:
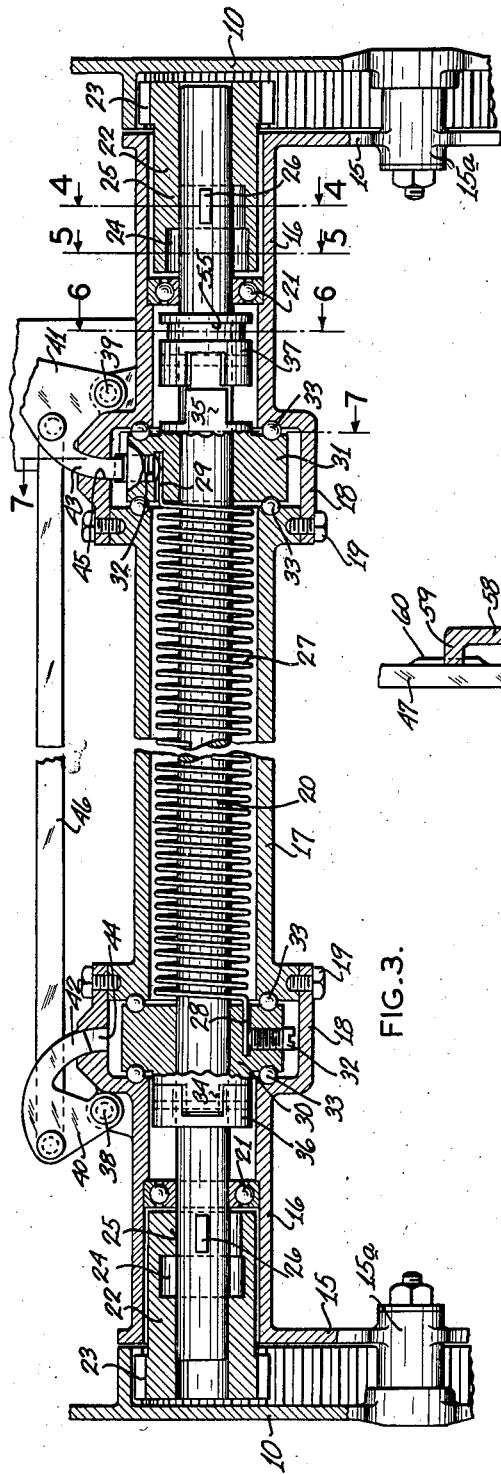
Fig. 3 is a longitudinal sectional view of the spring motor.
Figure 4:
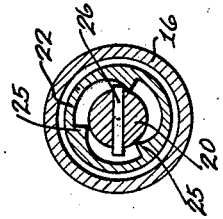
Figure 5:
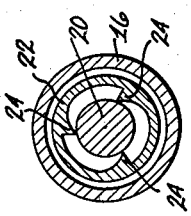
Figure 6:
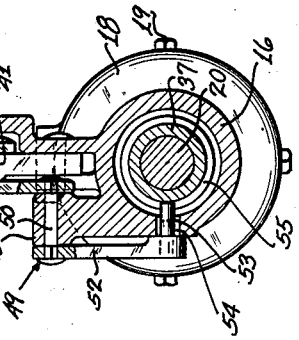
Figure 7:
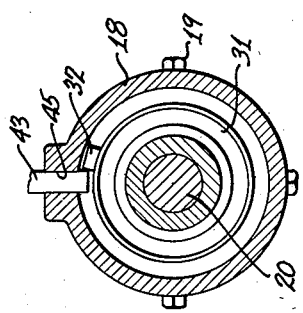

Figs. 4, 5, 6 and 7 are transverse sectional views of the spring motor taken at lines 4—4, 5—5, 6—6, and 7—7 respectively, on Fig. 3.

Figure 1:
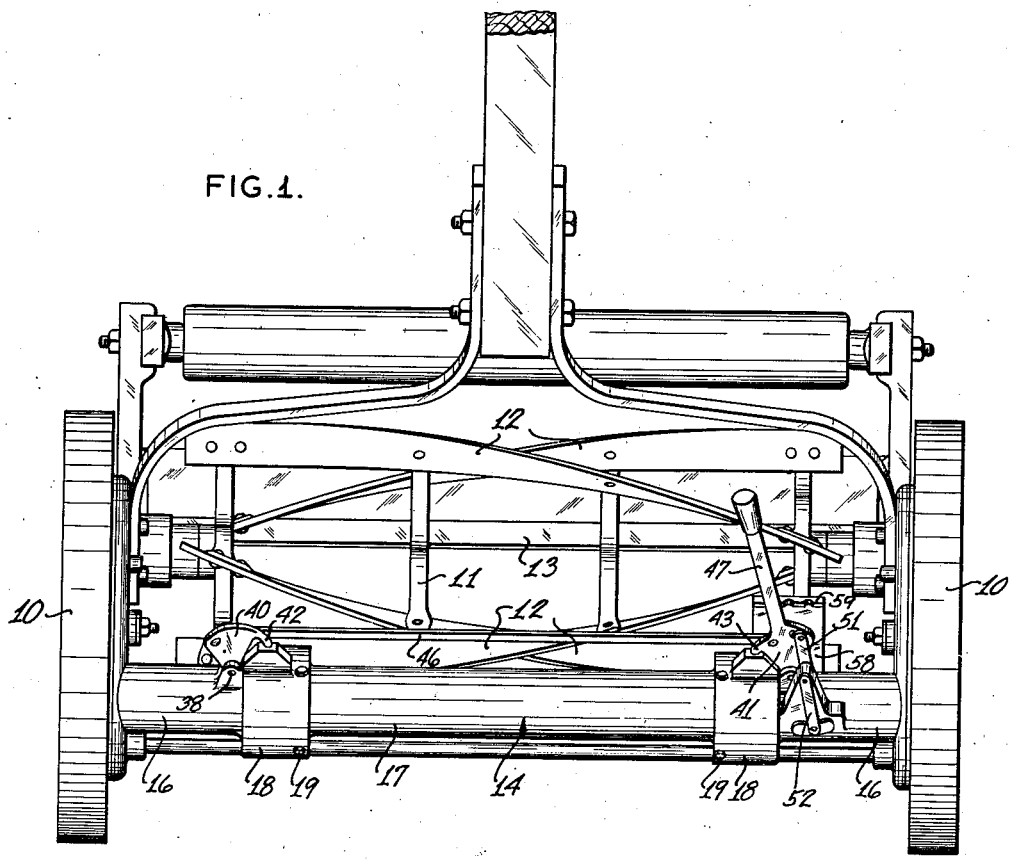
Fig. 1 is a plan view of a lawn mower to which the means of my invention have been applied.

Referring now by characters of reference to the drawings, in Fig. 1 which illustrates a hand powered lawn mower of conventional design, numerals 10 designate the supporting and driving wheels located at opposite ends of the machine, such wheels having internal gear teeth engaged by pinion gears (not shown) connected to the rotatable cutting reel 11 whose blades 12 are arranged to coact with the stationary blade 13. Numeral 14 designates the spring motor generally which is suitably mounted on the mower frame between the wheels 10 and is hereinafter described in detail.

With reference to Fig. 3, the mower frame includes bracket portions 15 having bearing members 15a on which the wheels 10 are journalled. The working parts of the motor are enclosed in a tubular housing comprising end portions 16 which, in the present example, are integral with the bracket portions 15, and an intermediate sleeve 17 detachably secured to the enlarged inner end parts 18 of the portions 16 by screws 19. A shaft 20 disposed within the tubular housing is rotatably mounted on anti-friction bearings 21, the shaft 20 also being adapted for endwise shifting movement in the housing.

On each end of shaft 20 there is provided a sleeve 22 having a pinion gear 23 formed integrally therewith, the gears 23 meshing with the internal gear teeth of the wheels 10. Sleeves 22 are loosely disposed on the shaft 20 and are adapted to be operatively connected thereto by means of ratchet mechanism. Thus, each sleeve is provided with two axially spaced sets of internal, relatively oppositely directed ratchet teeth 24 and 25. Adapted for selective coaction either with the teeth 24 or the teeth 25 are pawls 26 which are disposed in suitable slots in the shaft 20 for sliding movement transversely of said shaft. As appears in Fig. 3 the pawls 26 are disposed for engagement with the ratchet teeth 25. Accordingly, when sleeves 22 tend to rotate in a clockwise direction (Fig. 4), relative to the shaft, the teeth 25 engage the pawls 26 and the sleeves and shaft are locked together for conjoint rotation. In the reverse direction of relative rotation the pawls ride over the ends of the teeth, permitting the sleeves to turn independently of the shaft. As has been previously mentioned shaft 20 is adapted for endwise shifting movement. When the shaft is shifted to the left (Fig. 3), pawls 26 are caused to register with the sets of ratchet teeth 24 and since these teeth are reversely directed as compared to teeth 25, interlocking of the sleeves and shaft will occur only when the sleeves tend to rotate in a counterclockwise direction (Fig. 5) relative to the shaft.

Disposed about the shaft 20 is a helical torsion spring 27 the opposite ends 28 and 29 of which are fixedly secured to collars 30 and 31 respectively as by means of set-screws 32, the screws 32 projecting radially beyond the outer surface of the collars to provide abutments for a purpose hereinafter explained. Collars 30 and 31 are loosely disposed on the shaft and are held against axial displacement by thrust bearings 33. The collars 30 and 31 are adapted alternatively to be locked to the shaft for rotation therewith, and this is accomplished by providing the collars 30 and 31 with axially projecting clutch teeth 34 and 35, arranged to coact with recessed clutch collars 36 and 37. Clutch collars 36 and 37 are keyed or otherwise suitably fixed to the shaft and positioned thereon so that either one or the other engages its companion clutch collar 30 and 31, depending upon the endwise shifted position of the shaft. As shown in Fig. 3, collar 30 is locked to the shaft through clutch collar 36, and the shaft is free to revolve independently of the collar 31 whose teeth 35 are disengaged from clutch collar 37. It will appear that when the shaft is shifted to the left, collar 36 is moved out of engagement with collar 30 and collar 37 is moved into engagement with collar 31 which has the effect of locking the right hand end of spring 27 to the shaft and concurrently freeing the left hand end of the spring from the shaft.

There will now be described provision for alternately locking the opposite ends of the spring to the housing or frame structure and which means are adapted to prevent the right hand end of the spring from turning when the left hand end is operatively connected to the shaft, as previously described, and conversely to fixedly secure the left hand end of the spring when its right hand end is connected to the shaft.

Mounted externally on the opposite tubular housing portions 16 to rock about pivot pins 38 and 39 are detents 40 and 41 having arcuate nose projections 42 and 43 which are adapted to extend through openings 44 and 45 in the housing portions and to move into and out of the paths of movement of the projecting ends of set screws 32 on the collars 30 and 31. As will appear the detents 40 and 41 are arranged and interconnected by a link bar 46 to be positioned alternately for abutting engagement with the set screws 32, the nose 42 being shown in its raised position where it is clear of its related set screw, and the nose 43 of the opposite detent 41 extending into the housing for locking engagement with its related set screw.

Figure 2:
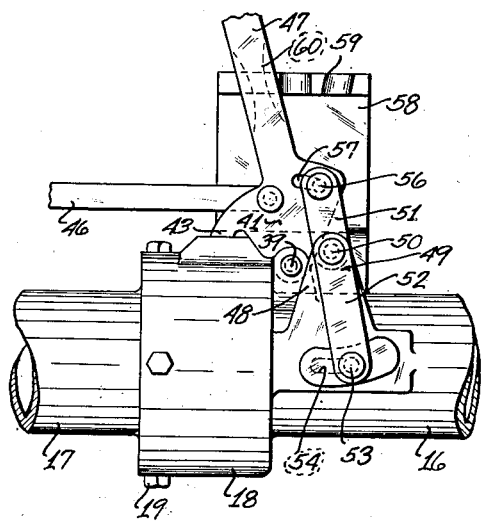
Fig. 2 is a fragmentary elevational view of shifting mechanism for the spring motor.

The detent 41 is provided with an extension 47 (Figs. 1 and 2) which serves as a handle or shift lever for effecting and controlling the movements of the detents 40 and 41 as aforesaid, and also endwise shifting movement of shaft 20. Thus, there is pivotally mounted on a projection 48 formed on the right-hand housing tube 16 a lever 49. The lever 49 comprises a bearing or pivot pin 50 journalled in the fixed part 48, an arm portion 51 fixedly secured to one end of pin 50 and projecting upwardly therefrom, and a downwardly projecting arm portion 52 fixedly secured to the opposite end of the pin 50. A finger 53 on the lower arm 52 extends through a slotted opening 54 in the housing and into an annular groove 55 formed in collar 37, which collar is secured to shaft 20. By the described means, rocking movement of lever 49 is effective to shift the shaft 20 in an endwise direction. A lost-motion operative connection is provided between the upper arm of lever 49 and the manual shift lever 47, such connection being a laterally projecting finger 56 that extends into a slot 57 in detent member 41. The purpose of the aforesaid lost-motion connection is to permit the detents 40 and 41 to be moved to intermediate positions, wherein both thereof lie clear of the set screw abutments 32, rendering both ends of the spring free to turn, without shifting the shaft. It will be understood that when shift lever 47 is moved to the position to free the collars 30 and 31 from the detents 42 and 43, spring 20 becomes inoperative. Thus the described mechanism may be said to be in neutral condition and is so disposed for level surface mowing. As a means for temporarily holding the shift lever in either forward, neutral or reverse positions there is provided an upstanding bracket 58 on the housing 16, said bracket having a notched lip 59 for engagement with a longitudinal ridge 60 formed on shift lever 47.

While it is believed that the operation of the spring motor of my invention will be understood from the foregoing description, for purposes of completeness a reviewal of the modus operandi is hereinafter set forth.

If the user is mowing an inclined terrace from the bottom thereof he will adjust the spring motor so that the spring will become wound on the down hill or idling stroke of the mower and unwound to aid in driving the mower on the uphill, cutting stroke. Accordingly, the shift lever 47 is moved to the left as appears in Fig. 1, causing shaft 20 to shift to the right to place pawls 26 in registration with the sets of ratchet teeth 25, to cause interengagement of clutch collars 30 and 36 and disengagement of clutch collars 31 and 37, and to cause detent 41 to hold collar 31 against turning while freeing collar 30 from its detent 40. Accordingly, the left-hand end of spring 20 is operatively connected to the shaft and the right-hand end is effectually anchored to the housing.

Now, assuming the spring initially to be in unwound condition, the first uphill stroke of the mower will not effect any substantial rotation of the shaft, for the ratchet teeth 25, turning in a counterclockwise direction (Fig. 4) will slip by the pawls without operative engagement therewith. On the following down-hill stroke of the mower, however, the ratchet teeth 25, now rotating clockwise, grip pawls 26 and turn the shaft in that direction. Shaft rotation is transmitted to the left hand end of spring 20 through clutch collars 36 and 30, resulting in a winding of the spring. On the subsequent uphill stroke spring 20 unwinds and exerts a driving force on the wheels 10, such force being transmitted from the spring through clutch collars 30 and 36 to the shaft, and from the shaft through pawls 26, ratchet teeth 25, sleeve 22 and pinion gear 23 to the wheels 10.

If the user desires to mow the inclined terrace from a position at the top thereof, shift lever 47 is moved to the right, which, as will be understood, causes pawls 26 to coact with the ratchet teeth 24 and also effects a relative reversal of the fixed and movable ends of the spring. Now as the mower undergoes a downhill, cutting stroke the spring is wound, and it unwinds on the return uphill stroke to aid the user in drawing the mower uphill.

For level surface mowing shift lever 47 is moved to its vertical or neutral position. In this position both of the detents 40 and 41 are disposed out of the path of movement of the set screws 32, and hence both ends of the spring are free to turn with the shaft, and will so turn because one or the other of the spring ends remains connected to the shaft. It will be understood, however, that since all parts of the spring are free to turn, no energization thereof will occur.

While I have described my invention as applied to a lawn mower, it will be understood that spring motor hereof will have other applications as well. Moreover, the specific mechanism herein shown and described is illustrative only and various changes may be made therein without departing from the spirit and full intendment of the invention as defined by the appended claims.

I claim as my invention:

1. The combination in a hand-powered lawn mower, a frame, a rotatable cutter and ground wheels for driving said cutter, a shaft journalled in said frame, a member mounted on said shaft and geared to one of said ground wheels, ratchet means for operatively connecting said member and shaft, a torsion spring on said shaft, and means for connecting the opposite ends of said spring respectively to the mower frame and to said shaft.

2. The combination in a hand-powered lawn mower having a frame, a rotatable cutter and a ground wheel for driving said cutter, a shaft journalled on said frame, gears operatively interconnecting said shaft and ground wheel, a helical torsion spring on said shaft, coordinated clutch means at the opposite ends of said spring adapted alternately to connect the opposite spring ends to the shaft, and coordinated detents on the mower frame operable alternately to hold the ends of said spring against turning.

3. The combination in a hand-powered lawn mower having a frame, a rotatable cutter and a ground wheel for driving said cutter, a spring motor having a tubular housing fixedly secured to the mower frame, a shaft mounted in said housing for rotation and endwise reciprocation, a pinion rotatable on said shaft and operatively connected to said ground wheel, ratchet means on said pinion, a pawl on said shaft adapted to be shifted, by endwise movement of the shaft, into and out of operative relation with said ratchet means, a helical torsion spring on said shaft, a pair of clutch assemblies, each adapted to connect one end of said spring to said shaft; a pair of detents on said housing, each adapted to secure one end of said spring against turning, said clutches and detents being operatively connected to said shaft and arranged, upon endwise shaft movement in one direction, to connect one end of said spring to the shaft and the opposite end of the spring to said housing, and upon endwise shaft movement in the opposite direction to connect the first said spring end to the housing and the opposite said spring end to said shaft.

4. In a lawn mower comprising a frame, a ground-engaging wheel carried by the frame, a cutter connected for operation by said wheel, a member journalled for rotation on said frame, gear means operatively interconnecting said member and ground wheel, a torsion spring, means operatively connecting one end of said spring to said member, and means on said frame for holding the opposite end of said spring against rotation, said ground wheel acting to load said spring when the mower is driven in one direction, and said spring acting to drive the mower in the opposite direction.

5. In a lawn mower, the combination of a frame, ground wheels mounted thereon, a cutter operatively connected to said ground wheels, a shaft journalled in said frame, means operatively connecting said shaft and ground wheels, a torsion spring, clutches for selectively connecting the ends of said spring to said shaft, and means for selectively securing the ends of said spring to said frame.

6. In a lawn mower including a frame, ground wheels mounted thereon, a movable cutter connected to be operated by said ground wheels, a shaft connected to said ground wheels and mounted for rotation and endwise reciprocation in said frame, a torsion spring on said shaft, a pair of clutches mounted on said shaft, each adjacent one end of said spring, said clutches being adapted alternately to connect the spring ends to said shaft responsive to endwise reciprocation thereof, detents on said frame for locking the ends of said spring thereto, and means interconnecting said clutches and detents whereby endwise movement of the shaft in one direction operates to connect one end of the spring to the shaft and the opposite end to the frame, and endwise movement of the shaft in the opposite direction operates to connect the first said spring end to the frame, and the said opposite spring end to the shaft.

7. In combination in a lawn mower, a frame, a shaft journalled on said frame, ground wheels at the ends of said shaft, adjustable ratchet means for operatively connecting said ground wheels and shaft, said means being adapted, selectively, to effect a unidirectional driving connection between said ground wheels and shaft for either direction of rotation of said ground wheels; a torsion spring on said shaft, clutch means adjacent the ends of said spring adapted, selectively, to connect either end of said spring to said shaft, and detent means on said frame adapted, selectively, to hold either end of said spring against rotation relative to the frame.

GUSTAV D. AHRGAL.